United States Patent [19]
Hamilton, Jr.

[11] Patent Number: 5,405,780
[45] Date of Patent: Apr. 11, 1995

[54] APPARATUS FOR BATCH COMPOSTING OF WASTE MATERIAL

[75] Inventor: John M. Hamilton, Jr., Presque Isle, Me.

[73] Assignee: Spectre Resources Associates, Ltd., Atlanta, Ga.

[21] Appl. No.: 71,068

[22] Filed: Jun. 4, 1993

Related U.S. Application Data

[63] Continuation-in-part of Ser. No. 870,549, Apr. 17, 1992, abandoned.

[51] Int. Cl.⁶ .......................... C12M 1/06; B01F 7/08
[52] U.S. Cl. .................................... 435/315; 435/316; 422/229; 422/184; 366/288; 366/345
[58] Field of Search .................. 435/313, 315, 316; 422/184, 229; 366/287, 288, 345; 71/9, 11; 210/528, 530; 37/253, 254, 255, 270, 304, 305, 389, 390, 391, 392, 393, 383, 410

[56] References Cited

U.S. PATENT DOCUMENTS

| | | | |
|---|---|---|---|
| 3,114,622 | 12/1963 | Hardy | 435/315 |
| 3,191,775 | 6/1965 | Schepman | 210/528 |
| 3,357,812 | 12/1967 | Snell | 71/9 |
| 3,364,007 | 1/1968 | Redman | 71/9 |
| 4,053,421 | 10/1977 | Pentz et al. | 210/528 |
| 4,062,770 | 12/1977 | Kneer | 71/9 |
| 4,248,538 | 2/1981 | Sukup | 366/287 |
| 4,255,389 | 3/1981 | Jung et al. | 71/9 |
| 4,776,960 | 10/1988 | Cerroni | 422/225 |
| 4,828,399 | 5/1989 | Pacentino et al. | 422/184 |
| 4,869,877 | 9/1989 | Sellew et al. | 422/184 |
| 5,187,097 | 2/1993 | Weber et al. | 71/9 |

FOREIGN PATENT DOCUMENTS

| | | | |
|---|---|---|---|
| 1158143 | 6/1958 | France | 37/254 |
| 2042492 | 9/1980 | United Kingdom | 422/184 |

*Primary Examiner*—Robert J. Warden
*Assistant Examiner*—T. A. Trembley
*Attorney, Agent, or Firm*—Kennedy & Kennedy

[57] ABSTRACT

The composting of waste material in a batch mode is accomplished by microbiological aerobic activity in a closed cylindrical vessel. The batch composting facility comprises bottom aeration (18) and an agitation auger mechanism (1) to ensure both aerobic and homogeneous composting conditions.

12 Claims, 5 Drawing Sheets

5,405,780

APPARATUS FOR BATCH COMPOSTING OF WASTE MATERIAL

REFERENCE TO RELATED APPLICATION

This application is a continuation-in-part of U.S. patent application Ser. No. 870,549, filed Apr. 17, 1992, now abandoned.

TECHNICAL FIELD

This invention relates to apparatuses for use in the composting of waste material.

BACKGROUND OF THE INVENTION

From today's environmental perspective, there is an increasing need to develop environmentally friendly industrial practices. Current methods of handling organic waste materials have led to serious pollution problems such as ground water contamination, biological kills, and poor air quality. For example, the common practice of spreading pig and cow manure on fields often gives rise to odor complaints in addition to the resultant loss of intrinsic fertilizer value due to ammonia release.

The present invention relates to the field of composting whereby organic material is decomposed through the action of bacteria. The synthesis of a compost by such methods addresses environmental concerns, especially if the process is carried out under aerobic conditions. Under aerobic control, thermophilic bacteria predominate thus minimizing the production of both noxious and dangerous gases such as hydrogen sulphide and methane often associated with nonaerobic activity. Aerobic conditions are dependent on the efficient passage of an oxygen bearing gas through the organic waste material. Other salient features of aerobic decomposition include the destruction of pathogenic organisms and the retention and fixation of ammonia. For example, temperatures as high as 50–60 degrees Centigrade must be maintained for reasonable periods of time to ensure the complete destruction of illness creating organisms, parasitic eggs, and seeds. Finally, the end product of this compost process has commercial value such as a soil conditioner, and earth improving material, or as a fertilizer.

In summary, the advantages of composting a variety of waste organic material include improved air quality relative to current practice and production of a natural soil conditioner and fertilizer. Also, material is diverted from landfills and waste process streams remain unpolluted. Besides animal manure and sewage sludge, such waste material may include food processing waste, sawmill residue, straw, and other cellulose bearing materials.

The recipe for feed to a compost unit is quite variable and depends on the nature of the main raw material. However, it is clear that the recipe should include both a bulking agent to reduce free moisture and a carbon source to supplement the deficiencies of the basic raw material, thus ensuring proper carbon/nitrogen ratios, sufficient porosity and reasonable NPK values in the final product.

A successful compost apparatus and method is dependent on a balanced recipe suited to the raw feed and local waste materials. Also of critical importance to ensure a homogeneous finely divided product are aerobic thermophilic conditions, proper mixing and agitation.

DESCRIPTION OF THE PRIOR ART

There are a number of composting facilities that fall with the spirit of the present invention in both method and apparatus. For example, in U.S. Pat. Nos. 4,869,877 and 4,828,399 and references cited therein, various windrow type applications are described. None of these patents describe a batch cylindrical composting facility.

In U.S. Pat. No. 4,062,770, a batch compost process is described which is based on adopting a control strategy which comprises the continuous monitoring of moisture, $CO_2$, and $O_2$. Application of this strategy whereby strict control on these parameters is applied eliminates the difficulties often associated with composting. Those difficulties eliminated include temperature stratification in the compost pile, the development of moisture pockets that promotes anaerobic activity, general areas of aerobic activity, etc. Relative to the present invention, the technology is very complicated and presents considerable difficulties for processing large amounts of waste material. In addition, the process does not provide for any mixing or agitation and, as a result, the compost product is not completely homogeneous.

In U.S. Pat. No. 3,357,812 a continuous process is described wherein the movement and agitation of the material in a rectangular vessel is accomplished by a series of screws having a number of potential configurations. An improvement to this invention is provided in U.S. Pat. No. 4,776,960 wherein the screw or auger is angled with respect to horizontal and, through its sequence of operations, is extracted from the mass and returned to its starting position. Relative to the present invention, both technologies describe facilities that are continuous in terms of processing material but are discontinuous and complicated in terms of agitating and mixing the material. Additionally, these references, like all others of the known prior art, have augers which are supported above and extend into the material. The movement and rotation of these augers through the material oftentimes causes them to flex and thereby deviate from a proper rotation. This deviation causing undue stress and wear on the augers and their associated mechanics. These augers also do not extend to the bottom of the vessel, thus a layer of material adjacent the floor of the vessel is left unagitated throughout the process.

The present invention stresses an auger/screw and mixing/agitation motion that operates continuously until the batch process is complete. As such, the process enhances the production of a homogeneous, fully treated product which has well defined product specifications in terms of moisture content and fertilizer value. The apparatus used to carry out the process is uniquely constructed to limit undue stresses.

SUMMARY OF THE INVENTION

In a preferred form of the invention, an apparatus is provided for the batch composting of waste material by the aerobic and thermophilic action of microorganisms on a waste material in the presence of an oxygen bearing gas. The apparatus comprises a vessel for containing an active mass of waste material. The vessel has a floor and a generally cylindrical sidewall extending from the floor. Aeration distribution means are provided for introducing oxygen bearing gas into the waste material. The apparatus also has at least one rotating auger for mixing, agitating, breaking and distributing waste material substantially homogeneously throughout the vessel. Support means are provided for supporting a lower end of the auger for travel upon the vessel floor. Means are also provided for moving the auger in a forward direction through the waste material along a plurality of substantially circular paths of travel of diverse radii.

DETAILED DESCRIPTION

Figure 1:
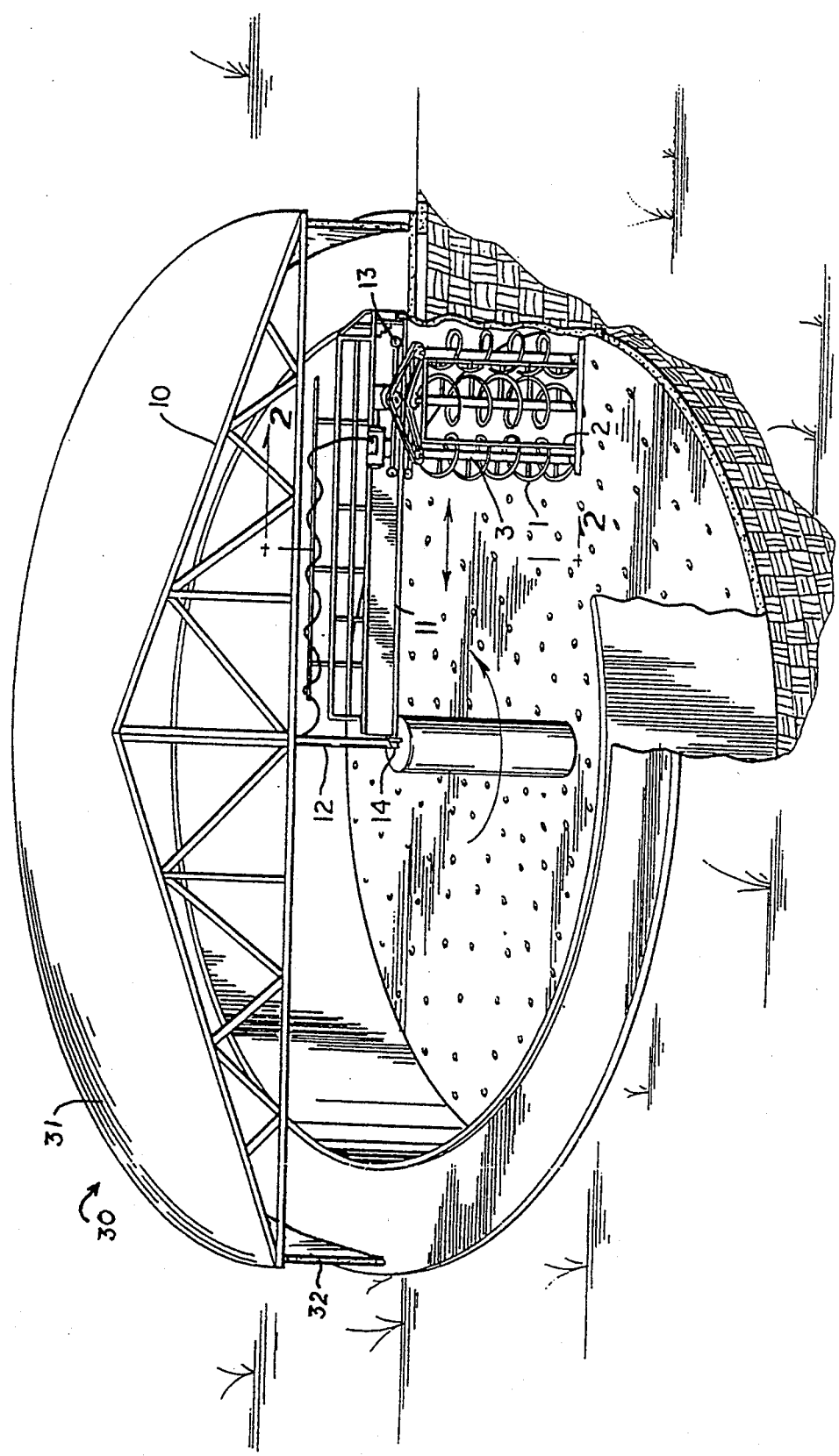
FIG. 1 is a perspective view of a batch composting system according to this invention.
Figure 2:
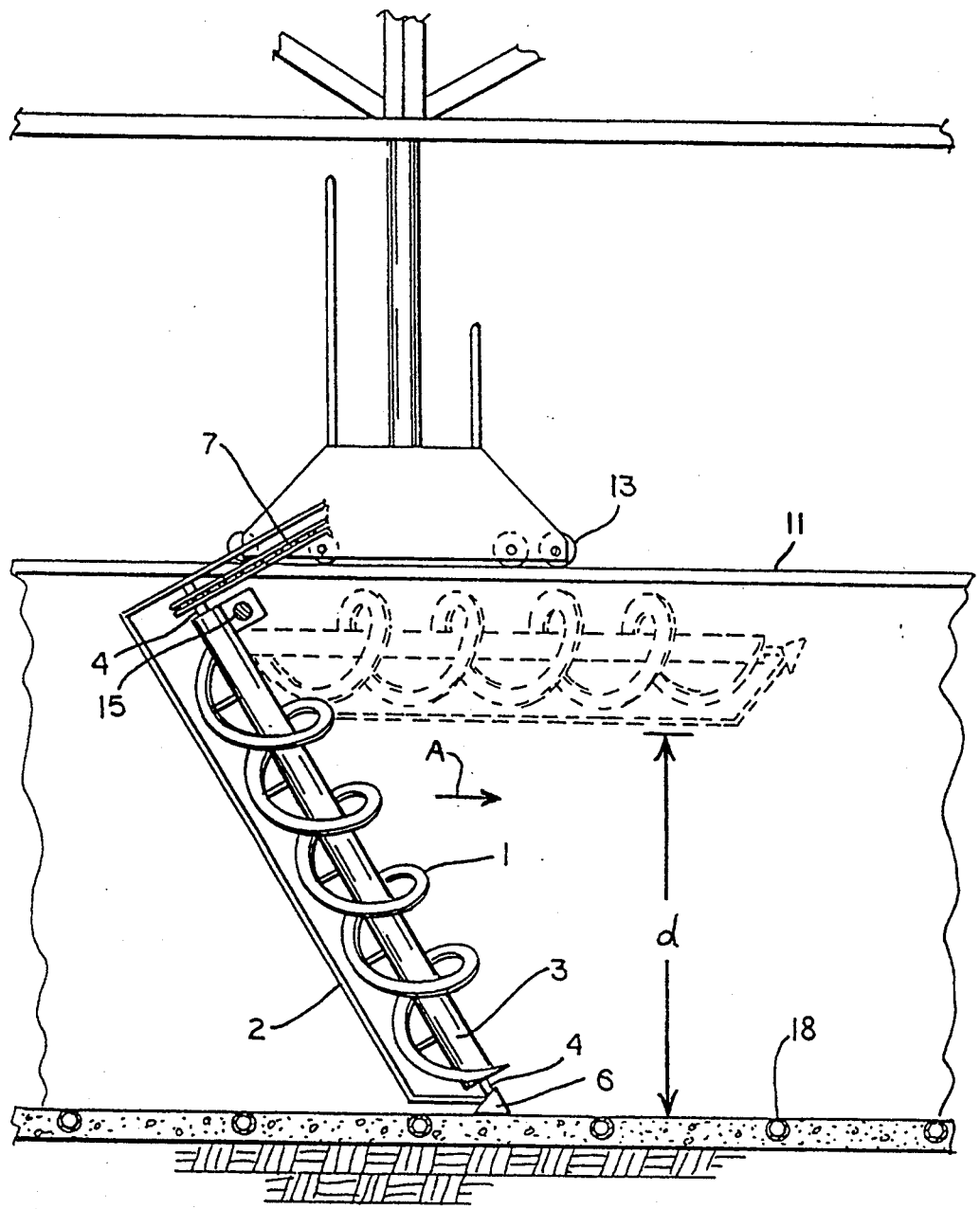
FIG. 2 is a side elevational view of a portion of the system of FIG. 1 taken along the line 2—2 in FIG. 1.
Figure 3:
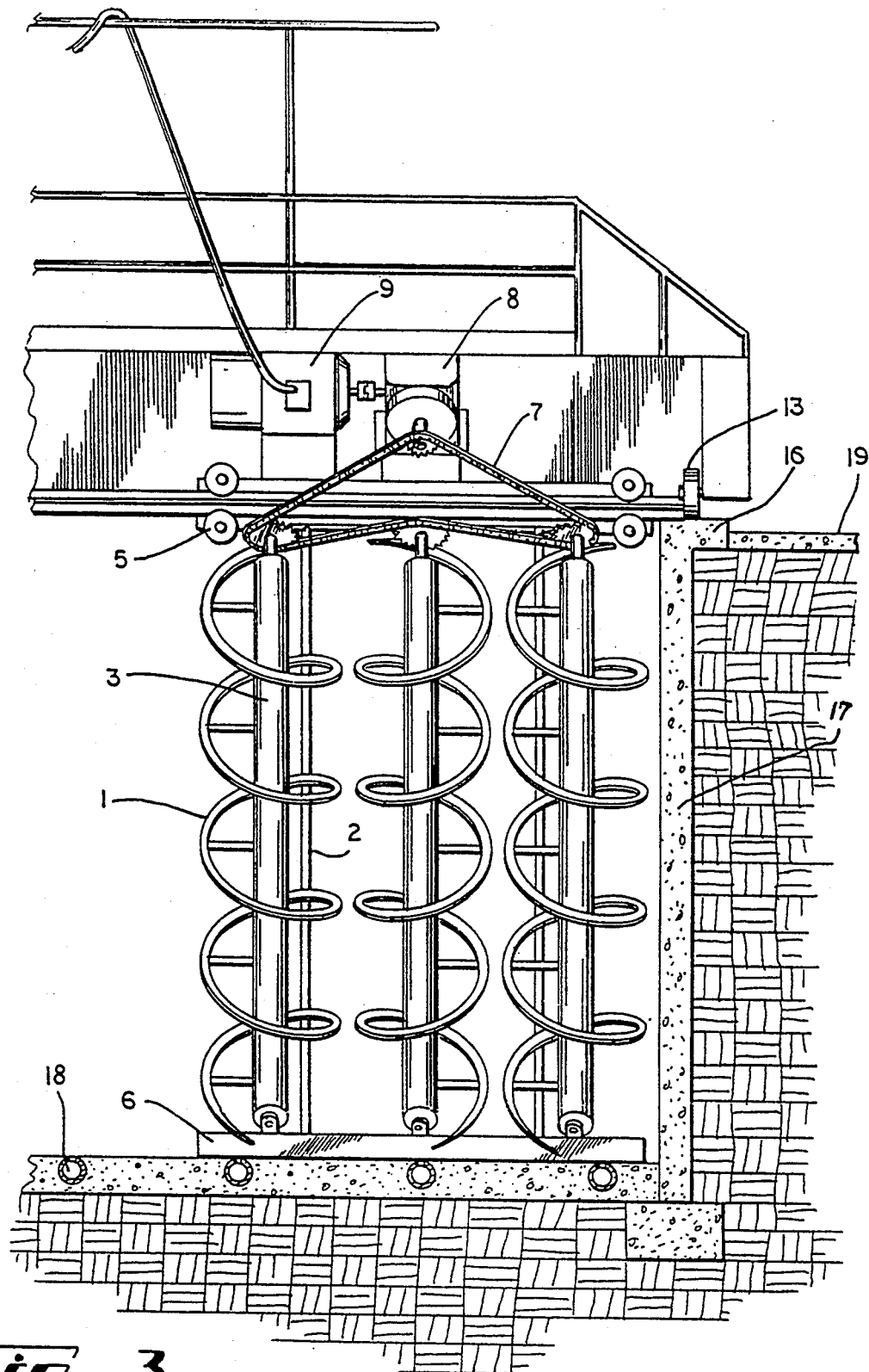
FIG. 3 is an enlarged front elevational view showing the system auger and related components of the system of FIG. 1.
Figure 4:
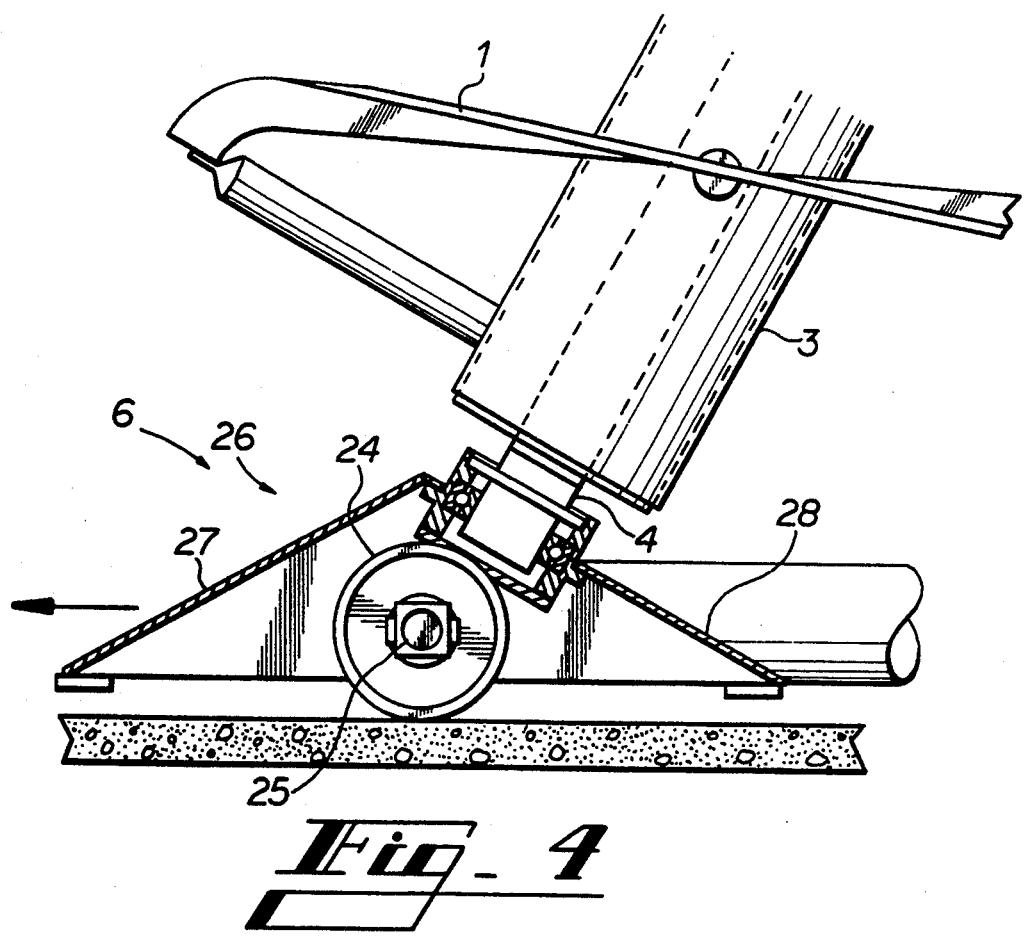
FIG. 4 is a side elevational view of a wheel housing of the system of FIG. 1.

The apparatus comprises mechanical agitation/mixing coupled with the controlled distribution of compressed air. The method of agitation and the associated apparatus are based on a mechanical system comprising an auger assembly having one or more, preferably three, rotating ribbon screw augers 1. Of course, other auger designs shown in the prior art may also be used. Augers 1 are mounted in support frame 2 by means of shafts 3 which are supported at the ends thereof by appropriate bearings 4. Frame 2 also includes a rolling and sliding guide system 5 and a bottom scraper 6 to assist in the mixing and agitation of the material as well as for supporting and guiding the augers. The scraper 6 has four wheels 24 mounted upon a common axle 25 and a wheel housing 26 extending about the wheels 24. The wheel housing 26 has a front deflection plate 27 and a rear support plate 28. Augers 1 are mounted on an axis angled 30 degrees off vertical to allow for forward horizontal thrust of the material during the agitation process as well as to ensure vertical movement of the material. In FIG. 2 such forward direction is indicated by arrow A. Frame 2 also embodies a drive system including chain and sprocket assembly 7, gear box 8, and motor assembly 9. Frame 2 also includes appropriate electrical controls, a lubricating system, safety provisions, etc., necessary for safe and proper operation.

Frame 2 is further mounted on carriage assembly 10 which travels radially on a beam assembly 11 which is pivotally mounted on an upright 12. The beam assembly is configured to allow a complete agitation path or swath that sweeps a preselected circumference on each rotation of beam assembly 11. The auger assembly is moved to a new horizontal positions on rotating beam assembly by means of motor 9 and activating chain and sprocket assembly 7 to allow different circumferential agitation paths. By altering the carriage position, a thorough agitation of the material is accomplished to ensure that homogeneity is achieved. Auger rotational speeds of 10-20 rpms are utilized for this application, with an optimal rotation speed being 15 rpms. Also, auger 1 is pivotable about pivot point 15 to allow it to be swung into a horizontal position above the compost material, as shown in FIG. 2, the depth d of which may, for example, be 12 feet as shown in FIG. 2.

Beam assembly 11 is equipped with driven roller wheels 13 on its outer end and pivot means 14 on its inner end so that it may be driven by wheels 13 about upright 12 in a rotary motion along circular track 16. This rotary motion is achieved by known motor means. The beam assembly 11 is deployed in a closed cistern 17 which typically is 80 feet in diameter and typically 13-19 feet in depth. The cistern has a flat floor containing a recessed air distribution system comprising spaced holes 18 and deck 19 which surrounds it circumferentially.

Figure 5:
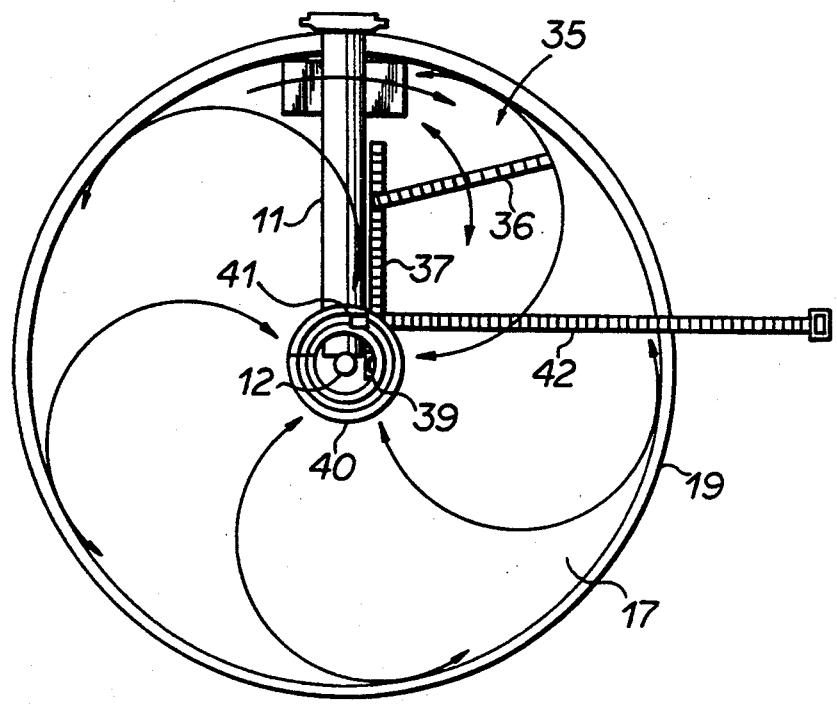
FIG. 5 is a top view of the system of FIG. 1.
Figure 6:
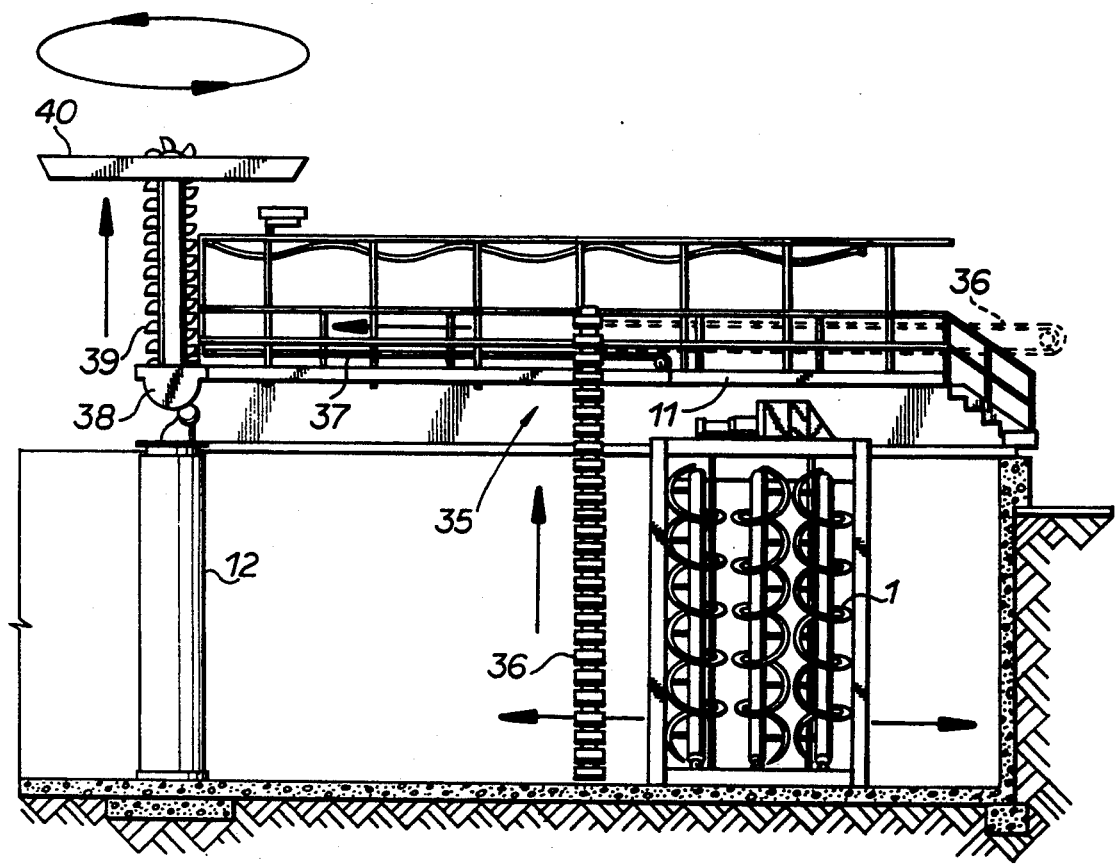
FIG. 6 is a front elevational view of the system of FIG. 1.

The apparatus also has an unloading assembly 35 for the removal of compost from the cistern, as shown in FIGS. 5 and 6. The unloading assembly 35 has a bucketed conveyor belt 36 pivotably mounted to a central portion of the beam assembly 11. The conveyor may be stored in a position generally parallel to the beam assembly, as shown in phantom lines in FIG. 6. The unloading assembly also includes a second conveyor 37 mounted along the beam assembly, a central container 38 mounted adjacent upright 12, a third conveyor 39, an annular trough 40 having a hole 41 therethrough, and a fourth, permanently mounted, conveyor 42.

A housing 30 having a roof 31 and side walls 32 substantially enclose the cistern 17 from ambience. An unshown air filtration system is included which filters the air within the housing prior to exhausting it to ambiance.

In use, material to be composted is placed within the cistern 17 to a depth below the augers in their raised, horizontal configuration. With the carriage assembly 10 positioned at its outermost position along the beam assembly 11 the augers assembly is lowered into the compost material so as to be supported on the cistern floor by the bottom scraper 6. The beam assembly 11 is rotated about the upright 12 so as to drive the actuating augers in a circular path. The forward motion of the augers through rotation of the beam assembly and the inclined angle of the auger imparts a downward force on the auger sufficient to maintain the scraper 6 upon the cistern floor. As the scraper 6 moves along the cistern floor its front deflection plate 27 deflects compost material adjacent the floor upwards towards the rotating augers. This aids in mixing all portions of the compost material while also aiding in forcing the auger assembly downward so that the augers remain embedded within the compost material. This action of the deflection plate also prevents compost material from being compressed below the scraper wheels 24, as the continued compression of the material could cause a buildup of material which would raise the auger well above the cistern floor. Additionally, with the augers supported on each of their ends they are extremely stable, thus reducing the chances of their deviating from a proper rotation due to the torquing forces upon them. After each complete rotation of the beam assembly the carriage assembly 10 is moved inward so that the next swath of preselected diameter of the auger assembly slightly overlaps its previous swath. The rotation speed of beam assembly 11 is adjusted at each complete rotation so that the average lateral advancement of the augers is approximately 2 inch per each complete auger rotation. The carriage assembly is moved in this manner until its innermost position is reached, i.e. the innermost auger is adjacent the upright 12. The direction of the carriage is then reversed so that the process continues with the augers being moved outward with each complete rotation of the beam assembly.

Once the compost material is fully cured, as explained hereafter, the auger assembly is pivoted upward to its stored position above the compost material. The augers may also be pivoted in this manner so that they may be cleaned or worked upon. Conveyor belt 36 is then moved from its stored position along beam assembly 11 to a position generally normal to the beam assembly with its end resting upon the compost. The actuation of the conveyor belt causes it to dig into the compost until it reaches a position closely adjacent the floor of the cistern, as shown in FIG. 6. An unshown motor pivots conveyor belt 36 arcuately from side to side as the beam assembly is again rotated about the upright, thereby removing the compost from the cistern. Conveyor belt 36 deposits the compost onto conveyor belt 37, which in turn deposits it in container 38. Conveyor belt 39 then moves the compost vertically and deposits it on trough 40 where it is finally deposited on the fixed conveyor belt 42 which conveys the compost to another area for final preparation.

Therefore, it can be seen that this invention relates primarily to a proper balanced compost recipe, simple apparatus design and operational format, operation in a batch mode, and continuous mixing to ensure homogeneity. Batch operation ensures that all organic waste material is decomposed and sterilized before final use and that pathogens are destroyed. In addition, a homogeneous product of controlled moisture content is produced. Such features are not easily achieved in continuous reactors due to the interface of material segments having undergone different decomposition. This problem is corrected by increasing the retention time. However, it is an object of this invention to minimize retention times with the production of a value added safe handling end product.

In a typical case, a 21 day cycle comprises two days of recipe conditioning, 14 days of composting, and five days of curing, leading to a final product suitable for a bagging and storage operation. A typical recipe comprises 5% peat, 5% straw, and 90% combined urea cow manure. Water holding capacity of the final product is such that typically approximately 10% by weight can be reintroduced into the waste material as a quality bulking agent for subsequent compost batches, significantly improving process economics. Further, the invention provides means of agitating the compost feed to maximize the porosity and resultant improved aeration of the waste material. As such, improved aerobic activity is maintained. Also, the invention provides a very simple apparatus design that is an economic and commercially viable approach to the treatment of waste organic material.

Other aspects of the invention relate to the choice of bulking agents and additional carbon sources which are essential ingredients to a balanced compost recipe. It has been observed that free moisture in the compost tank has the single largest impact on achieving optimum aerobic composting. By selectively controlling the free moisture, a good active compost can be maintained at temperatures in excess of 50 degrees centigrade for periods in excess of three days thus ensuring destruction of pathogens. Suitable bulking agents include peat and compost and readily available carbon sources include straw, sewage sludge and compost. Suitable bulking agents will have the capacity for adsorbing cations, anions, and any malodorous compounds. This retards the leaching of $NO^-_3$ and $PO^=_4$ and, by their acidic nature, prevents the loss of ammonia ($NH_3$) released in decomposition.

While it is recognized that those skilled in the art can improve on the process and apparatus as described, it is within the spirit and scope of the invention that executing a compost in a batch mode in a cylindrical vessel by employing a series of augers for agitation comprises the framework of the present invention, the specifics of which are described in the appended claims.

I claim:

1. Apparatus for the batch composting of waste material by the aerobic and thermophilic action of microorganisms on a waste material in the presence of an oxygen bearing gas, comprising, in combination, a vessel for containing an active mass of waste material, said vessel having a floor and a generally cylindrical sidewall extending from said floor; aeration distribution means for introducing oxygen bearing gas into the waste material; at least one rotating auger for mixing, agitating, breaking and distributing waste material substantially homogeneously throughout said vessel; support means for supporting a lower end of said at least one rotating auger for travel upon said floor; and means for moving said at least one rotating auger in a forward direction through the waste material along a plurality of substantially circular paths of travel of diverse radii.

2. The apparatus of claim 1 wherein said support means has at least one wheel and a deflection plate mounted adjacent said at least one wheel for deflecting the waste material away from said at least one wheel and away from said floor and upwardly into a path of travel of said auger.

3. The apparatus of claim 1 further comprising housing means for substantially sealing said vessel from ambiance.

4. The apparatus of claim 1 wherein said at least one rotating auger is supported by said support means along an incline oriented upwardly and opposite to said forward direction and wherein said at least one rotating auger moving means imparts a downward force sufficient to maintain said support means upon said floor.

5. The apparatus of claim 4 wherein said at least one rotating auger is supported at an angle of approximately 30° off vertical.

6. Apparatus for the batch composting of waste material by the aerobic and thermophilic action of microorganisms on a waste material in the presence of an oxygen bearing gas, comprising in combination, a vessel for containing an active mass of waste material, said vessel having a floor and a sidewall extending from said floor; an aeration distribution arrangement for the introduction of oxygen bearing gas into the waste material; at least one rotating auger to finely breakup and distribute a waste material homogeneously throughout said vessel via mixing and agitation; support means for supporting said at least one rotating auger for travel supported upon said floor; rotation means for moving said at least one rotating auger through the waste material in a circuitous fashion such that the travel of said at least one rotating auger includes circular paths of diverse radii; and unloading means for unloading the waste material from said vessel, said unloading means having a conveyor belt assembly pivotably mounted at one end to said rotation means and motor means for pivotably moving said conveyor belt assembly so as to have an opposite end of said conveyor belt assembly move arcuately over said floor.

7. The apparatus of claim 6 wherein said support means has at least one wheel and a deflection plate mounted adjacent said at least one wheel for deflecting waste material away from said wheel and away from said floor and towards said at least one rotating auger.

8. The apparatus of claim 6 further comprising a housing means for substantially sealing said vessel from ambiance.

9. Apparatus for composting organic materials comprising a vessel having a floor and a substantially cylindrical sidewall extending from said floor for containing a mass of organic materials; a post mounted centrally within said vessel; a beam assembly pivotably mounted to said post; carriage means mounted for movement along said beam assembly; at least one rotating auger mounted to said carriage means; and support means for supporting an end of said at least one rotating auger for travel upon said floor.

10. The apparatus of claim 9 wherein said support means has at least one wheel and a deflection plate mounted adjacent said wheel for deflecting waste material on said floor upwardly for engagement with said at least one rotating auger.

11. The apparatus of claim 9 further comprising an aeration distribution arrangement for the introduction of oxygen bearing gas into the waste material.

12. The apparatus of claim 9 further comprising a housing mounted so as to substantially seal said vessel from ambiance.

* * * * *